Figures 1, 2:
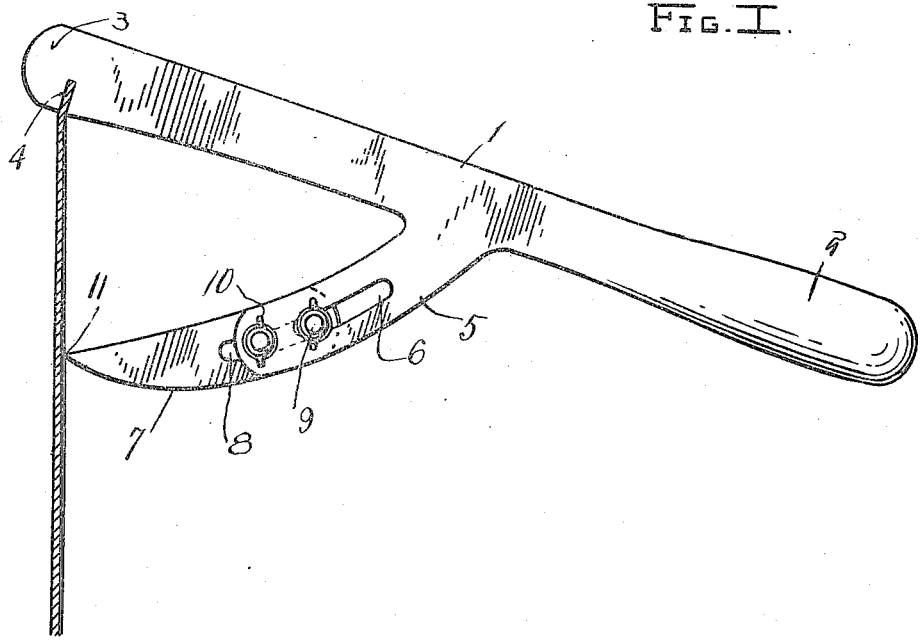

P. H. BARTZ.
SAW TOOTH SET.
APPLICATION FILED FEB. 2, 1915.

1,207,837.

Patented Dec. 12, 1916.

Witnesses
J. C. Simpson

Inventor
P. H. Bartz
By Chandler & Chandler
Attorneys

UNITED STATES PATENT OFFICE.

PAUL H. BARTZ, OF ALTURA, MINNESOTA.

SAW-TOOTH SET.

1,207,837.  Specification of Letters Patent.  Patented Dec. 12, 1916.

Application filed February 2, 1915. Serial No. 5,735.

*To all whom it may concern:*

Be it known that I, PAUL H. BARTZ, a citizen of the United States, residing at Altura, in the county of Winona, State of Minnesota, have invented certain new and useful Improvements in Saw-Tooth Sets; and I do hereby declare the following to be a full, clear, and exact description of the invention, such as will enable others skilled in the art to which it appertains to make and use the same.

This invention relates to a saw tooth set.

An object of the invention resides in the provision of a device by means of which the teeth of a saw may be bent at any desired angle.

A further object of the invention resides in so constructing the device that after the same has been adjusted all of the teeth may be bent alike.

With these and other objects in view, such as will appear as the description progresses, my invention comprises the combination and arrangement of parts as set forth in and falling within the scope of the appended claim.

Referring to the drawing: Figure 1 is a side elevation of my device, showing the same in place upon a saw tooth. Fig. 2 is a perspective view of the device.

Referring to the drawing wherein like parts are indicated by like characters throughout the several views: My device comprises a shank 1 on one end of which is formed a handle 2 and on the other end of which is formed a head 3. Extending inwardly into this head 3 is a slot 4 by means of which a tooth may be engaged to be bent.

In order that the angle through which the teeth are bent may be varied and in order that all the teeth may be bent alike I have formed an outwardly extending arcuate arm 5 integral with the shank 1 in which extends a longitudinal slot 6. Slidably mounted on one face of this arm 5 is a slide 7 having a slot 8 therein. Extending through the slot 6 in the arm 5 and through a suitable hole in the slide 7 is a thumb screw 9 while extending through the slot 8 in the slide 7 and a suitable hole in the arm 5 is an additional thumb screw 10. When these thumb screws are tightened the slide will be clamped in position upon the face of the arm 5, but when they are loosened the slide may be adjusted on the arm as desired. The end of the slide 7 terminates in a point 11 for the engagement of the face of the saw.

In operation the head 3 is placed upon the saw so that one of the teeth engages in the slot 4 and the slide 7 is secured on the arm 5. This slide 7 extends in the direction of the body portion of the saw. The handle of the shank 1 is gripped and pushed downwardly which action bends the tooth. This downward movement is limited by the engagement of the point 11 of the slide 7 with the adjacent face of the saw.

From the foregoing description it will be seen that I have provided an exceedingly simple and yet efficient device for bending saw teeth, and I have so constructed the device that the distances the teeth are bent may be varied and so that all of the teeth will be bent alike without imposing upon the operator the duty of gaging the teeth.

While I have illustrated and described a particular embodiment of my invention, I have merely done so for the sake of convenience and I do not wish to be limited to that particular embodiment of my invention as it is obvious that numerous changes may be made within the details of construction thereof without in any way departing from the spirit of the invention as defined by the scope of the appended claim.

What I claim is:—

A saw tooth set consisting of a shank having a handle on one end thereof and a slotted head on the other end thereof adapted to engage a tooth of a saw, an arcuate arm formed integrally with and extending outwardly and forwardly from said shank, and having a hole and an arcuate slot therein, a slide having a pointed end and a slot and a hole therein, a thumb screw passing through the slot in the arm and the hole in the slide and a second thumb screw passing through the slot in the slide and the hole in the arm constructed and arranged to clamp the said arm and slide together in adjusted positions.

In testimony whereof, I affix my signature, in the presence of two witnesses.

PAUL H. BARTZ.

Witnesses:
 HENRY R. PERSONS,
 JOHN S. FRITZ.

Copies of this patent may be obtained for five cents each, by addressing the "Commissioner of Patents, Washington, D. C."